(12) United States Patent
Liu

(10) Patent No.: US 12,408,166 B2
(45) Date of Patent: Sep. 2, 2025

(54) CHANNEL TRANSMISSION METHOD AND APPARATUS, AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 309 days.

(21) Appl. No.: 18/044,490

(22) PCT Filed: Sep. 30, 2020

(86) PCT No.: PCT/CN2020/119602
§ 371 (c)(1),
(2) Date: Mar. 8, 2023

(87) PCT Pub. No.: WO2022/067740
PCT Pub. Date: Apr. 7, 2022

(65) Prior Publication Data
US 2023/0345469 A1 Oct. 26, 2023

(51) Int. Cl.
*H04W 72/1268* (2023.01)
*H04L 1/08* (2006.01)
*H04W 72/232* (2023.01)

(52) U.S. Cl.
CPC ........... *H04W 72/1268* (2013.01); *H04L 1/08* (2013.01); *H04W 72/232* (2023.01)

(58) Field of Classification Search
CPC ........... H04W 72/1268; H04W 72/232; H04W 72/0446; H04W 72/046; H04W 72/231;
(Continued)

(56) References Cited

U.S. PATENT DOCUMENTS 11,102,688 B2 * 8/2021 Park ................. H04B 17/309
11,330,638 B2 * 5/2022 Xu ..................... H04W 88/08
(Continued)

FOREIGN PATENT DOCUMENTS

CA 3127126 A1 * 7/2020 .......... H04L 1/0003
CN 110022615 A * 7/2019 ........ H04W 72/1273
(Continued)

OTHER PUBLICATIONS

Office Action, dated Jan. 23, 2024, issued in Japanese Patent Application No. 2023-518879 (9 pages).
(Continued)

*Primary Examiner* — Mahendra R Patel
(74) *Attorney, Agent, or Firm* — Finnegan, Henderson, Farabow, Garrett & Dunner, L.L.P.

(57) ABSTRACT

A channel transmission method is performed by a terminal, and includes: determining a mapping relationship between at least one basic redundancy version (RV) sequence and a plurality of candidate transmission occasions for sending a physical uplink shared channel (PUSCH); determining an actual RV sequence corresponding to each of the plurality of candidate transmission occasions based on the at least one basic RV sequence; and repeatedly sending a data block of the PUSCH on a plurality of target transmission occasions respectively based on actual RV sequences corresponding respectively to the plurality of target transmission occasions.

19 Claims, 4 Drawing Sheets

(58) Field of Classification Search
CPC ....... H04L 1/08; H04L 1/1819; H04L 1/1864; H04L 5/0035; H04L 1/1896; H04L 5/0053; H04B 7/06952
USPC .......................................................... 370/329
See application file for complete search history.

(56) References Cited

U.S. PATENT DOCUMENTS

| | | | | |
|---|---|---|---|---|
| 11,374,723 | B2* | 6/2022 | Yi | H04W 24/10 |
| 11,381,361 | B2* | 7/2022 | Park | H04W 72/046 |
| 12,185,310 | B2* | 12/2024 | Muruganathan | H04L 5/006 |
| 12,261,696 | B2* | 3/2025 | Gao | H04B 7/024 |
| 2020/0221445 | A1* | 7/2020 | Tsai | H04W 72/0453 |
| 2021/0014874 | A1* | 1/2021 | Deogun | H04W 74/0808 |
| 2021/0037517 | A1* | 2/2021 | Lei | H04W 72/0466 |
| 2021/0314093 | A1* | 10/2021 | Mu | H04L 1/1621 |
| 2022/0131652 | A1* | 4/2022 | Bae | H04L 1/1864 |
| 2022/0132555 | A1* | 4/2022 | Blankenship | H04W 72/23 |
| 2022/0132595 | A1* | 4/2022 | Ko | H04W 74/0866 |
| 2022/0150982 | A1* | 5/2022 | Lee | H04W 74/0866 |
| 2022/0278807 | A1* | 9/2022 | Zhang | H04L 1/1812 |
| 2023/0069053 | A1* | 3/2023 | Yuan | H04L 5/0044 |

FOREIGN PATENT DOCUMENTS

| | | | | |
|---|---|---|---|---|
| CN | 111246582 A * | 6/2020 | | H04L 5/0053 |
| CN | 111656840 A * | 9/2020 | | H04L 1/0068 |
| CN | 111344980 B * | 7/2021 | | H04B 7/0617 |
| EP | 3920451 A1 * | 12/2021 | | H04L 1/0003 |
| WO | WO-2016182533 A1 * | 11/2016 | | H04L 1/1887 |
| WO | WO-2019027242 A1 * | 2/2019 | | H04B 7/15507 |
| WO | WO-2019157685 A1 * | 8/2019 | | H04L 5/0028 |
| WO | WO-2020069359 A1 * | 4/2020 | | H04L 1/1887 |
| WO | WO 2020141484 A1 | 7/2020 | | |

OTHER PUBLICATIONS

English Translation of Office Action dated Jan. 23, 2024, issued in Japanese Patent Application No. 2023-518879 (8 pages).
ZTE, "Enhancements on Multi-TRP and Multi-panel Transmission", 3GPP TSG RAN WG1 #98bis, R1-1910284, Chongqing, China, Oct. 14-20, 2019 (21 pages).
ZTE, "Discussion on unlicensed band URLLC/IIoT", 3GPP Tsg Ran WG1 Meeting #102-e, R1-2005433, e-Meeting, Aug. 17-28, 2020 (6 pages).
European Patent Office, Extended European Search Report issued in Application No. 20955763.6, dated Sep. 7, 2023, 11 pages.
Examination Report for India Application No. 202347025802, issued on Oct. 17, 2023, 7 pages.
International Search Report and Written Opinion of International Application No. PCT/CN2020/119602, dated Jun. 30, 2021, 13 pages.
Request for the Submission of an Opinion for Korean Application No. 10-2023-7011891, dated May 22, 2025, 13 pages.
Huawei, HiSilicon, "Feature Summary of Enhancements on Multi-TRP/Panel Transmission", 3GPP TSG RAN WG1 Meeting #99, R1-1913299, Reno, USA, Nov. 18-22, 2019, 88 pages,.
3GPP TS 38.214 V16.2.0 (Jun. 2020), 3rd Generation Partnership Project; Technical Specification Group Radio Access Network; NR; Physical layer procedures for data (Release 16), 163 pages.

* cited by examiner

CHANNEL TRANSMISSION METHOD AND APPARATUS, AND STORAGE MEDIUM

CROSS-REFERENCE TO RELATED APPLICATION

This application is a U.S. national phase of International Application No. PCT/CN2020/119602, filed on Sep. 30, 2020, the content of which is incorporated herein by reference in its entirety.

TECHNICAL FIELD

The present disclosure relates to a field of communications, and particularly to a channel transmission method and apparatus, and a storage medium.

BACKGROUND

In order to improve a coverage of a cell edge and provide a balanced quality of service within a serving cell, multi-point collaboration is still an important technical means in a new radio (NR) system.

From the perspective of a network morphology, by implementing a network deployment in a centralized processing manner of combining a large number of distributed access points with a baseband, it is more conducive to provide a balanced user experience rate, and significantly reduce a latency and a signaling overhead caused by handoff. As the frequency band increases, a relatively dense access point deployment is also required from the perspective of ensuring a network coverage. In a high-frequency band, with improvement of an integration of an active antenna device, a modular active antenna array is more likely to be adopted. An antenna array of each transmission and receiving point (TRP) may be divided into several relatively independent antenna panels, so that a shape and a port number of the entire array surface may be flexibly adjusted with deployment scenarios and service requirements. However, antenna panels or TRPs may also be connected by an optical fiber, to implement a more flexible distributed deployment. In a millimeter wave band, as the wavelength decreases, a blocking effect generated by obstacles such as a human body or a vehicle may be more significant. In this case, starting from the perspective of ensuring robustness of a link connection, collaboration between multiple TRPs or PANELs may also be used to perform transmission/reception with multiple beams on multiple directions, thereby reducing an adverse effect caused by the blocking effect.

In an R16 research stage, transmission enhancement is performed on a physical downlink shared channel (PDSCH) based on an application of a multi-point cooperation transmission technology between downlink multi-TRPs or panels. Since data transmission includes a schedule feedback of uplink and downlink channels, only performing enhancement on the downlink data channel cannot ensure a service performance in a study of ultra-reliable and low latency communication (URLLC). Therefore, in the study of Release 17 (R17), enhancement is performed on a physical downlink control channel (PDCCH), a physical uplink control channel (PUCCH) and a physical uplink shared channel (PUSCH).

Taking the PUSCH as an example, the enhancement may be performed by repeatedly transmitting the PUSCH, and a current PUSCH enhancement mode is designed for a single TRP but not applicable for a multi-TRP scenario.

SUMMARY

According to a first aspect of embodiments of the present disclosure, a channel transmission method performed by a terminal is provided, and includes:
determining a mapping relationship between at least one basic redundancy version (RV) sequence and a plurality of candidate transmission occasions for sending a physical uplink shared channel (PUSCH);
determining an actual RV sequence corresponding to each of the plurality of candidate transmission occasions based on the at least one basic RV sequence; and
repeatedly sending a data block of the PUSCH on a plurality of target transmission occasions respectively based on actual RV sequences corresponding respectively to the plurality of target transmission occasions.

According to a second aspect of embodiments of the present disclosure, a non-transitory computer-readable storage medium having a computer program stored thereon is provided. The computer program is configured to perform the channel transmission method described in the first aspect.

According to a third aspect of embodiments of the present disclosure, a channel transmission apparatus is provided, and includes:
a processor; and
a memory configured to store instructions executable by the processor;
in which, the processor is configured to perform the channel transmission method described in the first aspect.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The exemplary embodiments will be described in detail here, and examples thereof are shown in the accompanying drawings. When the following descriptions refer to the accompanying drawings, same numbers in different drawings represent same or similar elements unless otherwise indicated. The implementations described in the following exemplary embodiments do not represent all implementations consistent with embodiments of the present disclosure. Rather, they are merely examples of apparatuses and methods consistent with some aspects of the disclosure as detailed in the appended claims.

The terms described in the present disclosure are only for the purpose of describing specific embodiments and are not intended to limit the present disclosure. The singular forms "a", "the" and "said" used in the disclosure and the attached claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in this disclosure to describe various information, such information shall not be limited to these terms. These terms are only used to distinguish the same category of information. For example, subject to the scope of this present disclosure, first information may also be referred to as second information, and similarly, and second information may also be referred to as first information. It depends on the context. For example, the word "if" as used herein may be interpreted as "in a case that" or "when" or "in response to determining".

Two PUSCH enhancement modes of R15 and R16 are introduced before a channel transmission solution provided in the present disclosure is described.

A first enhancement mode is a transmission mode of repetition type A adopted in R15.

Figure 1A:
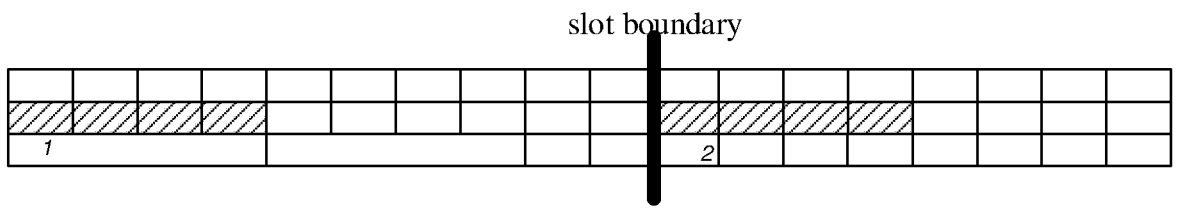
FIGS. 1A to 1D are diagrams illustrating a repetition transmission mode of a PUSCH according to an embodiment.

The transmission mode of repetition type A is a slot aggregation PUSCH transmission mode at a slot level. For example, as illustrated in FIG. 1A, a PUSCH is repeatedly transmitted on continuous K transmission occasions (i.e., nominal repetition), and a value of K in FIG. 1A is 2. Transmission starts from an Sth symbol of a start slot, each transmission occasion lasts L symbols, and a value of L in FIG. 1A is 4.

Note that, (S+L) does not exceed a slot boundary. For example, when a slot includes 14 time symbols, (S+L) does not exceed 14.

The transmission mode of repetition type A is not suitable for services with a low latency requirement and a high reliability requirement.

Figure 1B:
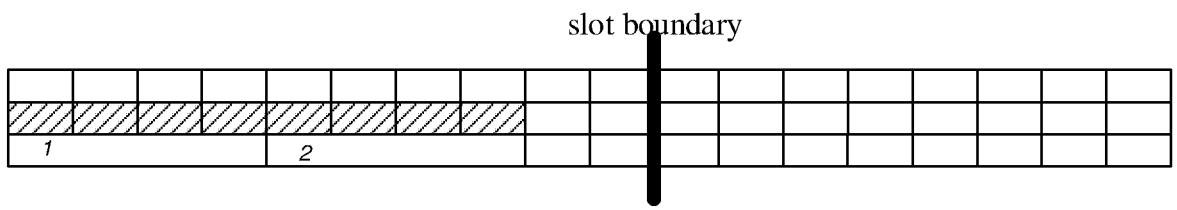

In a time domain, transmission of a PUSCH starts from an Sth symbol of a start slot, K transmission occasions are continuously sent, and each transmission occasion continuously occupies L symbols, as illustrated in FIG. 1B.

Further, in the transmission mode of repetition type B, (S+L) may cross a slot boundary. When a transmission occasion crosses a slot boundary, the transmission occasion is re-divided, to correspondingly obtain an actual transmission occasion (i.e., actual repetition) K', for example, as illustrated in FIG. 1C and FIG. 1D.

Figure 1C:
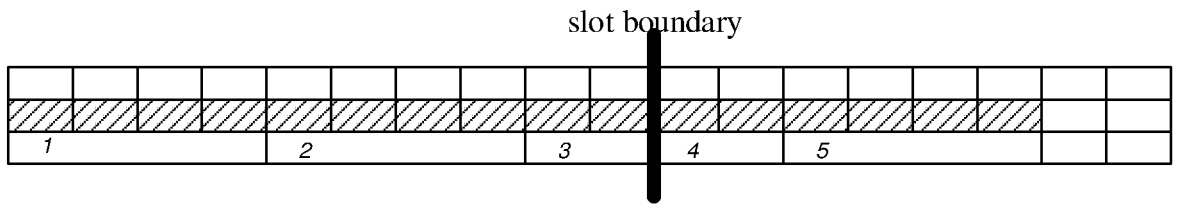

In FIG. 1C, the third transmission occasion is re-divided into two actual transmission occasions by a slot boundary since it crosses the slot boundary, that is, in FIG. 1C, the number K of transmission occasions of the PUSCH is 4, but the number K' of actual transmission occasions is 5.

Figure 1D:
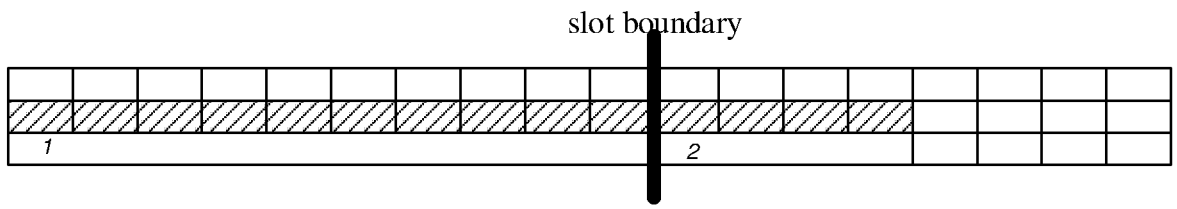

In FIG. 1D, there is only one transmission occasion. The transmission occasion is re-divided into two actual transmission occasions by a slot boundary since it crosses the slot boundary, that is, in FIG. 1D, the number K of transmission occasions of the PUSCH is 1, but the number K' of actual transmission occasions is 2.

The base station may indicate that a semi-static flexible time symbol is a dynamic uplink symbol or a dynamic downlink symbol by a slot format indicator (SFI). Therefore, the semi-static flexible time symbol may be available for the PUSCH (that is, the flexible time symbol is an uplink signal available for PUSCH transmission), or may be unavailable for the PUSCH (that is, the flexible time symbol is a downlink signal unavailable for PUSCH transmission). When there is an unavailable time symbol, the unavailable time symbol needs to be dropped, and the PUSCH is transmitted on the remaining available symbols. That is, for the whole transmission, a slot L×K may represent a size of a time window for PUSCH transmission. When uplink transmission is unable to be performed on a certain time symbol within the time window, the PUSCH may not be transmitted on the time symbol, the transmission occasion needs to be dropped, and the PUSCH is transmitted on the other transmission occasions.

The values corresponding to the transmission mode of repetition type A and the transmission mode of repetition type B are illustrated in Table 1.

TABLE 1

| | | Basic Cyclic Prefix | | | Extended Cyclic Prefix | | |
|---|---|---|---|---|---|---|---|
| Repetition Transmission Mode of PUSCH | Start Time Symbol S of Start Slot | Duration L of Each Transmission Occasion | S + L | Start Time Symbol S of Start Slot | Duration L of Each Transmission Occasion | S + L | |
| Transmission Mode of Repetition Type A | 0 | {4, . . . , 14} | {4, . . . , 14} | 0 | {4, . . . , 12} | {4, . . . , 12} | |
| Transmission Mode of Repetition Type B | {0, . . . , 13} | {1, . . . , 14} | Type A {1, . . . , 14} Type B {1, . . . , 27} | | {0, . . . , 11} | {1, . . . , 12} | Type A {1, . . . , 12} Type B {1, . . . , 23} | |

A second enhancement mode is a transmission mode of repetition type B adopted in R16.

In order to be suitable for services with a low latency requirement and a high reliability requirement, a repetition transmission mode of the PUSCH in unit of a mini-slot is proposed in R16, that is, the transmission mode of repetition type B, which allows a repetition transmission of the PUSCH to cross a slot, thereby further reducing a latency.

The transmission mode of repetition type A and the transmission mode of repetition type B are applicable to a single RTP scenario, but do not support the terminal to repeatedly transmit the PUSCH by using a multi-TRP technology to improve the reliability of data transmission.

Currently, when the PUSCH is repeatedly transmitted, a corresponding redundancy version (RV) sequence needs to be determined. A method for determining the RV sequence is illustrated in Table 2.

TABLE 2

| Start Value of RV Sequence Indicated by | RV Sequence (n is a transmission occasion) | | | |
|---|---|---|---|---|
| Downlink Control Information | n mod4 = 0 | n mod4 = 1 | n mod4 = 2 | n mod4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Corresponding to the transmission mode of repetition type A, the RV sequence is directly mapped to all transmission occasions, the base station sends downlink control information (DCI) and indicates the start value of the RV sequence by means of an RV information field of the DCI. For example, if the RV information field in the DCI is 2 bits, and the bit value is 10, it corresponds to the RV sequence with the start value of 2 in Table 2, i.e., 2, 3, 1, 0.

Corresponding to the transmission mode of repetition type B, the RV sequence is directly mapped to all actual transmission occasions, the base station sends downlink control information (DCI) and indicates the start value of the RV sequence by means of the RV information field of the DCI.

In order to support a multi-TPR scenario when repeatedly transmitting a PUSCH, a mapping between different RV transmission parameters and different transmission occasions needs to be considered, which is not involved in a current solution.

In order to solve the technical problem, a channel transmission solution is provided in the disclosure, which supports multi-TRP transmission by allocation of RV parameters when the PUSCH is repeatedly transmitted.

Figure 2:
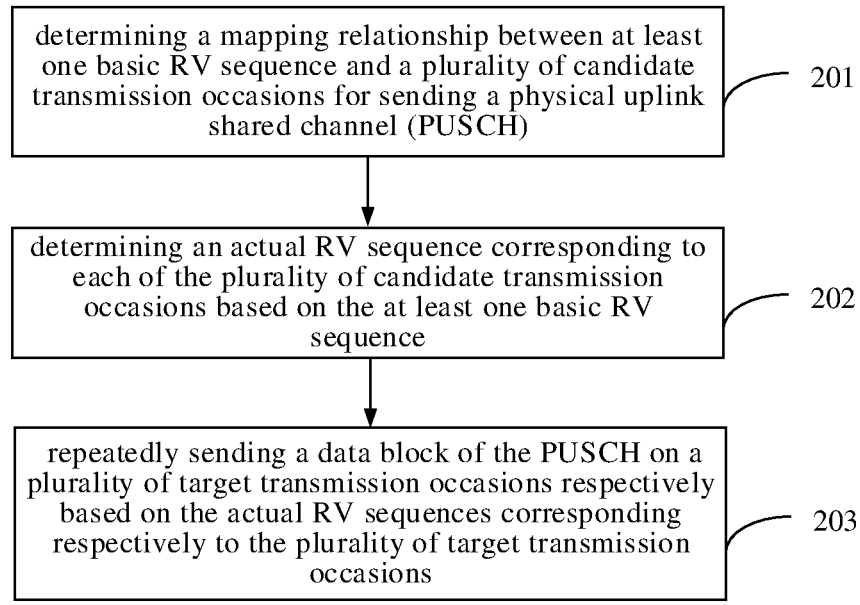
FIG. 2 is a flowchart illustrating a channel transmission method according to an embodiment.

A channel transmission method is provided in embodiments of the present disclosure, and applicable to a terminal. As illustrated in FIG. 2, FIG. 2 is a flowchart illustrating a channel transmission method according to an embodiment. The method may include the following steps.

At step 201, a mapping relationship between at least one basic RV sequence and a plurality of candidate transmission occasions for sending a physical uplink shared channel (PUSCH) is determined.

At step 202, an actual RV sequence corresponding to each of the plurality of candidate transmission occasions is determined based on the at least one basic RV sequence.

In embodiments of the present disclosure, an actual RV sequence refers to an RV sequence for sending the PUSCH obtained by performing cyclic mapping based on the basic RV sequence corresponding to the corresponding candidate transmission occasion. For example, the basic RV sequence is 0, 2, 3, 1, and the actual RV sequence may be the RV sequence obtained by performing cyclic mapping based on any sequence in Table 2. For example, in the case of four transmission configurations, the corresponding RV sequence may be 2, 3, 1, 0 or 1, 0, 2, 3.

At step 203, a data block of the PUSCH is repeatedly sent on a plurality of target transmission occasions respectively based on the actual RV sequences corresponding respectively to the plurality of target transmission occasions.

In the above embodiments, the terminal may determine a mapping relationship between at least one basic RV sequence and a plurality of candidate transmission occasions for sending the PUSCH. An actual RV sequence corresponding to each candidate transmission occasion is determined based on the at least one basic RV sequence, and a data block of the PUSCH is repeatedly sent on a plurality of target transmission occasions respectively based on the actual RV sequences corresponding respectively to the plurality of target transmission occasions. The present disclosure implements repetition transmission of the PUSCH, at the same time multi-TRP transmission may be supported by means of allocation of RV parameters, which improves the reliability of data transmission.

In an optional embodiment, for the step 201, when determining the mapping relationship, the mapping relationship may be determined based on a first signaling sent by a base station or a setting predefined in a protocol. The first signaling may be a higher-layer radio resource control (RRC) signaling or a media access control address (MAC) signaling, which is not limited in the disclosure.

In the above embodiment, the mapping relationship may be configured by a base station, or predefined in a protocol, which can be implemented simply and has a high availability.

In an optional embodiment, the mapping relationship may be determined by any one of the following modes.

In a first mode, the mapping relationship may be determined based on a first corresponding relationship between different beam indication information received by different transmission and receiving points (TRPs) corresponding to a base station and the plurality of candidate transmission occasions.

Figure 3:
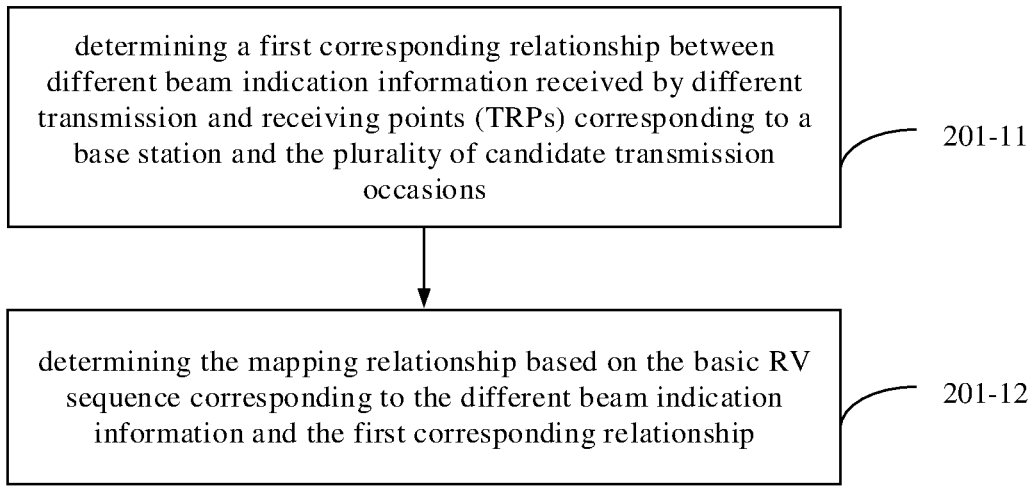
FIG. 3 is a flowchart illustrating a channel transmission method according to another embodiment.

As illustrated in FIG. 3, FIG. 3 is a flowchart illustrating a channel transmission method with reference to the embodiment illustrated in FIG. 2. Step 201 may include following steps.

At step 201-11, a first corresponding relationship between different beam indication information received by different transmission and receiving points (TRPs) corresponding to a base station and the plurality of candidate transmission occasions is determined.

The beam indication information is beam related information for sending the PUSCH. In embodiments of the present disclosure, the beam indication information may include spatial relation info, or uplink (UL) transmission configuration indicator (TCI) state information.

At step 201-12, the mapping relationship is determined based on the basic RV sequence corresponding to the different beam indication information and the first corresponding relationship.

In embodiments of the present disclosure, different beam indication information may correspond to a same basic RV sequence or different basic RV sequences, and the terminal may determine a mapping relationship between at least one basic RV sequence and a plurality of candidate transmission occasions for sending a physical uplink shared channel (PUSCH) based on the basic RV sequence(s) corresponding to different beam indication information and the first corresponding relationship.

In the above embodiment, the mapping relationship may be determined based on the first corresponding relationship between the different beam indication information and the plurality of candidate transmission occasions, which can be implemented simply and has a high availability.

Figure 4:
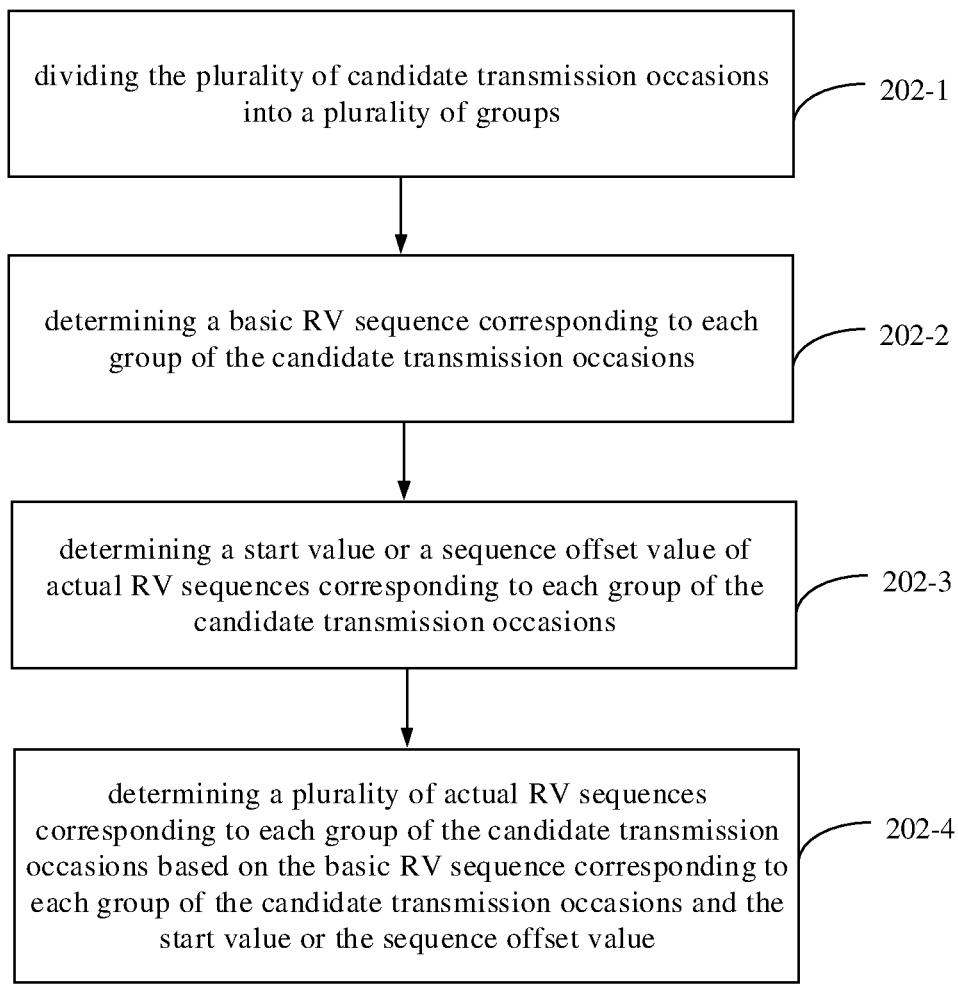
FIG. 4 is a flowchart illustrating a channel transmission method according to another embodiment.

In an optional embodiment, as illustrated in FIG. 4, FIG. 4 is a flowchart illustrating a channel transmission method with reference to the embodiment illustrated in FIG. 3. Step 202 may include following steps.

At step 202-1, the plurality of candidate transmission occasions are divided into a plurality of groups.

Each group of the candidate transmission occasions corresponds to same beam indication information. For example, the plurality of candidate transmission occasions include two groups of the candidate transmission occasions. A first group of the candidate transmission occasions corresponds to beam indication information TCI-1, and a second group of the candidate transmission occasions corresponds to beam indication information TCI-2.

At step 202-2, a basic RV sequence corresponding to each group of the candidate transmission occasions is determined.

In embodiments of the present disclosure, each group of the candidate transmission occasions may correspond to a basic RV sequence, and the plurality of groups of the candidate transmission occasions may correspond to same or different basic RV sequences. In embodiments of the present disclosure, the basic RV sequence corresponding to each group of the candidate transmission occasions may be informed by the base station to the terminal via a second signaling, or may be predefined in a protocol.

For example, two groups of the candidate transmission occasions may correspond to a same basic RV sequence, that is, {0, 2, 3, 1}. Or, the two groups of the candidate transmission occasions may correspond to different two basic RV sequences. For example, the first group of the candidate transmission occasions corresponds to a basic RV sequence 0, 2, 3, 1, the second group of the candidate transmission occasions corresponds to a basic RV sequence 0, 3, 0, 3, i.e., the two basic RV sequences are different.

At step 202-3, a start value or a sequence offset value of actual RV sequences corresponding to each group of the candidate transmission occasions is determined.

In embodiments of the present disclosure, the start value of the actual RV sequences corresponding to each group of the candidate transmission occasions may be directly determined. The start value may be a value in the basic RV sequence, which represents a value from which the actual RV sequences start to cycle based on the basic sequence. For example, if the basic RV sequence is {0, 2, 1, 3}, and the start value is 2, it indicates the first actual RV sequence value is 2, and subsequent actual RV sequences are cyclically mapped based on the basic RV sequence to obtain 2, 1, 3, 0, 2, . . . .

Optionally, the terminal may determine the sequence offset value of the actual RV sequences corresponding to each group of the candidate transmission occasions. The sequence offset value is an RV sequence starting position from which each group of the candidate transmission occasions performs a cyclic mapping with regard to the basic RV sequence. For example, the basic RV sequence is 0, 2, 1, 3, the sequence offset value is 3, and an offset reference point is a value of the RV sequence by default, it indicates that the actual RV sequence is an RV sequence with a start value 3 of the first RV sequence value determined based on the basic RV sequence, and subsequent actual RV sequences are cyclically mapped based on the basic RV sequence to obtain 3, 0, 2, 1, 3, . . . .

At step 202-4, a plurality of actual RV sequences corresponding to each group of the candidate transmission occasions is determined based on the basic RV sequence corresponding to each group of the candidate transmission occasions and the start value or the sequence offset value.

For example, if the basic RV sequence is 0, 2, 1, 3, and an actual RV sequence is an RV sequence with a start value 1 of the first RV sequence value determined based on the basic RV sequence, the subsequent actual RV sequences are cyclically mapped based on the basic sequence to obtain 1, 3, 0, 2, 1, . . . .

For another example, if the basic RV sequence is 0, 2, 1, 3, the sequence offset value is 2, and an offset reference point is a value of the RV sequence by default, it indicates that the actual RV sequence is an RV sequence with a start value 1 of the first RV sequence value determined based on the basic RV sequence, and the subsequent actual RV sequences are cyclically mapped based on the basic RV sequence to obtain 1, 3, 0, 2, 1, . . . . In the above embodiments, the actual RV sequence corresponding to each candidate transmission occasion may be determined based on the mapping relationship and the at least one basic RV sequence, which facilitates repeatedly transmitting the PUSCH on the plurality of target transmission occasions. The PUSCH is repeatedly transmitted, and at the same time multi-TRP transmission may be supported by means of allocation of RV parameters, which improves the reliability of data transmission.

In an optional embodiment, step 202-3 may be achieved by:

determining the start value or the sequence offset value of the actual RV sequences corresponding to each group of the candidate transmission occasions based on a specified information field included in downlink control information (DCI) sent by a base station.

In embodiments of the present disclosure, the start value or the sequence offset value of the actual RV sequences corresponding to each group of the candidate transmission occasions may be informed to the terminal by means of the specified information field included in the DCI. The specified information field may adopt an RV field in the DCI.

The RV field in the DCI includes 2 bits, which may only indicate the start value of the actual RV sequence for one beam indication information.

Optionally, the RV field in the DCI may be extended to independently indicate the start value of the actual RV sequences corresponding to each group of the candidate transmission occasions.

For example, there are two groups of the candidate transmission occasions, then the RV field may be extended to 4 bits. The former 2 bits are configured to indicate the start value of the actual RV sequences corresponding to the first group of the candidate transmission occasions, and the latter 2 bits are configured to indicate the start value of the actual RV sequences corresponding to the second group of the candidate transmission occasions.

Taking the two groups of the candidate transmission occasions corresponding to same basic RV sequence 0, 2, 3, 1 for example, if the bit value of the RV field is 1001, it indicates that the start value of the actual RV sequences corresponding to the first group of the candidate transmission occasions is 2, and the start value of the actual RV sequences corresponding to the second group of the candidate transmission occasions is 1.

In another example, the RV field may not be extended. The RV field is configured to indicate a corresponding RV codepoint of association information associated with the start value or the sequence offset value of the actual RV sequences corresponding to each group of the candidate transmission occasions.

Optionally, a second corresponding relationship between RV codepoints and RV sequence start values may be predetermined, for example, as illustrated in FIG. 3.

TABLE 3

| RV codepoint | Start Value of RV1 Sequence | Start Value of RV2 Sequence |
| --- | --- | --- |
| 0 | 0 | 2 |
| 1 | 1 | 3 |

TABLE 3-continued

| RV codepoint | Start Value of RV1 Sequence | Start Value of RV2 Sequence |
| --- | --- | --- |
| 2 | 2 | 0 |
| 3 | 3 | 1 |

The base station may send a value of 2 bits by means of the RV field of the DCI. Assume that the value of 2 bits is 10, the terminal may determine that the start value of the actual RV sequences corresponding to the first group of the candidate transmission occasions is 2 and the start value of the actual RV sequences corresponding to the second group of the candidate transmission occasions is 0 based on Table 3.

Optionally, the terminal may predetermine a third corresponding relationship between RV codepoints and sequence offset values, as illustrated in Table 4.

TABLE 4

| RV codepoint | Sequence Offset Value of RV1 Sequence | Sequence Offset Value of RV2 Sequence |
| --- | --- | --- |
| 0 | 0 | 2 |
| 1 | 1 | 3 |
| 2 | 2 | 0 |
| 3 | 3 | 1 |

The base station may still send a value of 2 bits by means of the RV field of the DCI. Assume that the value of 2 bits is 10, the terminal may determine that the sequence offset value of the actual RV sequences corresponding to the first group of the candidate transmission occasions is 2 and the sequence offset value of the actual RV sequences corresponding to the second group of the candidate transmission occasions is 0 based on Table 4. Correspondingly, when the basic sequence is 0, 2, 3, 1, the first actual RV sequence corresponding to the first group of the candidate transmission occasions is 3, 1, 0, 2, and the RV sequence is cycled at the subsequent occasions, and the first actual RV sequence corresponding to the second group of the candidate transmission occasions is 0, 2, 3, 1, and the RV sequence is cycled at the subsequent occasions.

In embodiments of the present disclosure, the second corresponding relationship and the third corresponding relationship as illustrated in Table 3 and Table 4 are configured by a base station by means of a third signaling or predefined in a protocol. The third signaling may be an RRC signaling or a MAC signaling.

In another example, the RV field may be further configured to indicate the start value of the first RV sequence relative to the first beam indication information in the actual RV sequences corresponding to each group of the candidate transmission occasions. The RV sequence corresponding to the first beam indication information is the first RV sequence.

When the specified information field is configured to indicate the start value of the first RV sequence relative to the first beam indication information in the actual RV sequences corresponding to each group of the candidate transmission occasions, an offset value of start values of other RV sequences in the actual RV sequences corresponding to each group of the candidate transmission occasions relative to the start value of the first RV sequence may be determined. Further, the base station may determine the start values of the other RV sequences respectively based on the start value of the first RV sequence and the offset value. The offset value is an offset value of the start values of the other RV sequences relative to the start value of the first RV sequence, which may be configured by a base station by means of a fourth signaling or predefined in a protocol. The fourth signaling may be an RRC signaling or a MAC signaling.

For example, the start value of the first RV sequence is RV1, and the offset value offset may be determined based on the fourth signaling or a protocol configuration. For example, the start values of the other RV sequences can be obtained based on a formula RV2=mod (RV1+offset, 4).

In the above solution, the plurality of groups of the candidate transmission occasions may correspond to a same basic RV sequence. In an optional embodiment, when the plurality of groups of the candidate transmission occasions correspond to different basic RV sequences, the mode may be described as follows.

A plurality of basic RV sequences are informed to the terminal in advance by means of the second signaling. For example, the basic RV sequences are [RV1, RV2], start values of different basic sequences corresponding respectively to two groups of the candidate transmission occasions may be indicated by extending the RV field of the DCI. For example, if the bit value of the RV field is 0010, then the first group of the candidate transmission occasions corresponds to the start value 0 in the RV1, and the second group of the candidate transmission occasions corresponds to the start value 2 in the RV2.

When the RV field of the DCI is not extended, Table 3 or Table 4 may be determined by means of a third signaling or a predefined protocol. The terminal may determine start values or sequence offset values of the actual RV sequences corresponding respectively to different groups of the candidate transmission occasions by querying Table 3 or Table 4 based on the value of the RV field. Assume that the RV1 is {0, 2, 3, 1}, the RV2 is {0, 3, 0, 3}, and the value of the RV field of the DCI is 01, then it may be obtained based on Table 3 that the start value of the actual RV sequences corresponding to the first group of the candidate transmission occasions is 1, that is, the first actual RV sequence is 1, 0, 2, 3, while the start value of the actual RV sequences corresponding to the second group of the candidate transmission occasions is 3, that is, the first actual RV sequence is 3, 0, 3, 0.

The method for determining the sequence offset value based on Table 4 is similar with the above method, which will not be repeated here.

In an optional embodiment, corresponding to the transmission mode of repetition type A, the plurality of candidate transmission occasions may include K1 nominal transmission occasions.

The K1 nominal transmission occasions are located within different slots respectively, start symbol positions of the K1 nominal transmission occasions within respective slots are same, and each slot contains a same number of continuous symbols.

The plurality of target transmission occasions include a plurality of second transmission occasions in response to a first transmission occasion existing in the K1 nominal transmission occasions; the first transmission occasion is a transmission occasion at which uplink PUSCH transmission is unable to be performed, and the plurality of second transmission occasions are transmission occasions at which uplink PUSCH transmission is able to be performed in the K1 nominal transmission occasions.

Similarly, for the above transmission mode of repetition type A, the plurality of candidate transmission occasions may directly include K1' actual transmission occasions; the KV actual transmission occasions are transmission occasions at which uplink PUSCH transmission is able to be performed in K1 nominal transmission occasions, and the K1 nominal transmission occasions are located within different slots respectively, start symbol positions of the K1 nominal transmission occasions within respective slots are same, and each slot contains a same number of continuous symbols.

Further, the plurality of target transmission occasions include the K1' actual transmission occasions.

Corresponding to the transmission mode of repetition type B, the plurality of candidate transmission occasions may include K2' actual transmission occasions; the K2' actual transmission occasions are actual transmission occasions obtained by dividing K2 nominal transmission occasions, and the K2 nominal transmission occasions are back-to-back continuously allocated transmission occasions.

Correspondingly, the plurality of target transmission occasions include a plurality of second actual transmission occasions. The plurality of second actual transmission occasions are transmission occasions at which uplink PUSCH transmission is able to be performed in the K2' actual transmission occasions.

Similarly, corresponding to the transmission mode of repetition type B, the plurality of candidate transmission occasions may include K2" actual transmission occasions; the K2" actual transmission occasions are transmission occasions at which uplink PUSCH transmission is able to be performed in K2' actual nominal transmission occasions; the K2' actual transmission occasions are actual transmission occasions obtained by dividing K2 nominal transmission occasions; and the K2 nominal transmission occasions are back-to-back allocated continuous transmission occasions.

Further, the plurality of target transmission occasions include the K2" actual transmission occasions.

In the above embodiment, the terminal may determine a mapping relationship between at least one basic RV sequence and a plurality of candidate transmission occasions based on a corresponding relationship between different beam indication information and the plurality of candidate transmission occasions, so as to determine the actual RV sequence corresponding to each of the plurality of candidate transmission occasions. Further, the terminal may repeatedly send a data block of the PUSCH on a plurality of target transmission occasions respectively based on the actual RV sequences corresponding respectively to the plurality of target transmission occasions. The PUSCH is repeatedly transmitted, and at the same time multi-TRP transmission may be supported by means of allocation of RV parameters, which improves the reliability of data transmission.

In an optional embodiment, the mapping relationship may be further determined by any one of the following modes.

In a second mode, the mapping relationship between the at the least one basic RV sequence and all candidate transmission occasions for sending the PUSCH is directly determined without distinguishing a first corresponding relationship between different beam indication information and the plurality of candidate transmission occasions.

Correspondingly, the plurality of candidate transmission occasions may include all nominal transmission occasions; correspondingly, the plurality of target transmission occasions include all actual transmission occasions at which uplink PUSCH transmission is able to be performed in the all nominal transmission occasions.

Optionally, the plurality of candidate transmission occasions include all actual transmission occasions at which PUSCH transmission is able to be performed; and the plurality of target transmission occasions include the all actual transmission occasions.

In the above embodiments, mapping between the basic RV sequence and the plurality of candidate transmission occasions may be directly performed without considering the first corresponding relationship between beam indication information and candidate transmission occasions. Similarly, the PUSCH is repeatedly transmitted, and at the same time multi-TRP transmission may be supported by means of allocation of RV parameters, which improves the reliability of data transmission.

Embodiments of a channel transmission apparatus corresponding to the embodiments of the channel transmission method are provided in the present disclosure.

Figure 5:
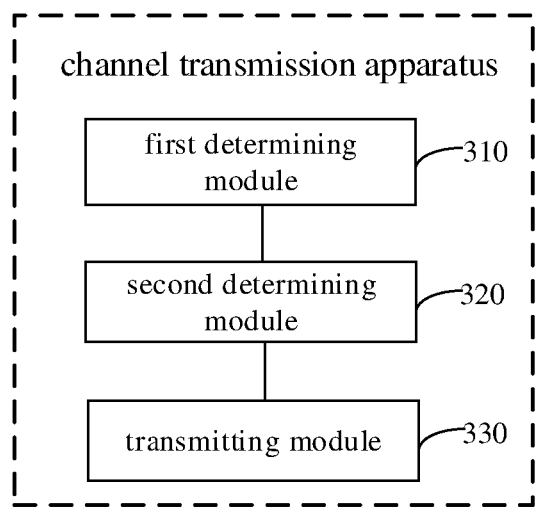
FIG. 5 is a block diagram illustrating a channel transmission apparatus according to an embodiment.

FIG. 5 is a block diagram illustrating a channel transmission apparatus according to an embodiment. The apparatus includes a first determining module 310, a second determining module 320 and a transmitting module 330.

The first determining module 310 is configured to determine a mapping relationship between at least one basic RV sequence and a plurality of candidate transmission occasions for sending a physical uplink shared channel (PUSCH).

The second determining module 320 is configured to determine an actual RV sequence corresponding to each of the plurality of candidate transmission occasions based on the at least one basic RV sequence.

The transmitting module 330 is configured to repeatedly send a data block of the PUSCH on a plurality of target transmission occasions respectively based on actual RV sequences corresponding respectively to the plurality of target transmission occasions.

The embodiments of the apparatus refer to part descriptions of embodiments of the method since they correspond to the embodiments of the method. The embodiments of the apparatus described above are only schematic, in which the above units described as separate parts may or may not be physically separated, the parts shown as units may or may not be physical units, which may be located in one place, or may be distributed to multiple network units. Some or all modules may be selected according to the actual requirements to achieve the purpose of the present disclosure. Those skilled in the art may understand and implement it without any creative effort.

Accordingly, a computer-readable storage medium having a computer program stored thereon is provided in the present disclosure. The computer program is configured to perform any channel transmission method described above.

Accordingly, a channel transmission apparatus is further provided in the disclosure, and includes:
 a processor; and
 a memory configured to store instructions executable by the processor;
 the processor is configured to perform any channel transmission method described above.

Figure 6:
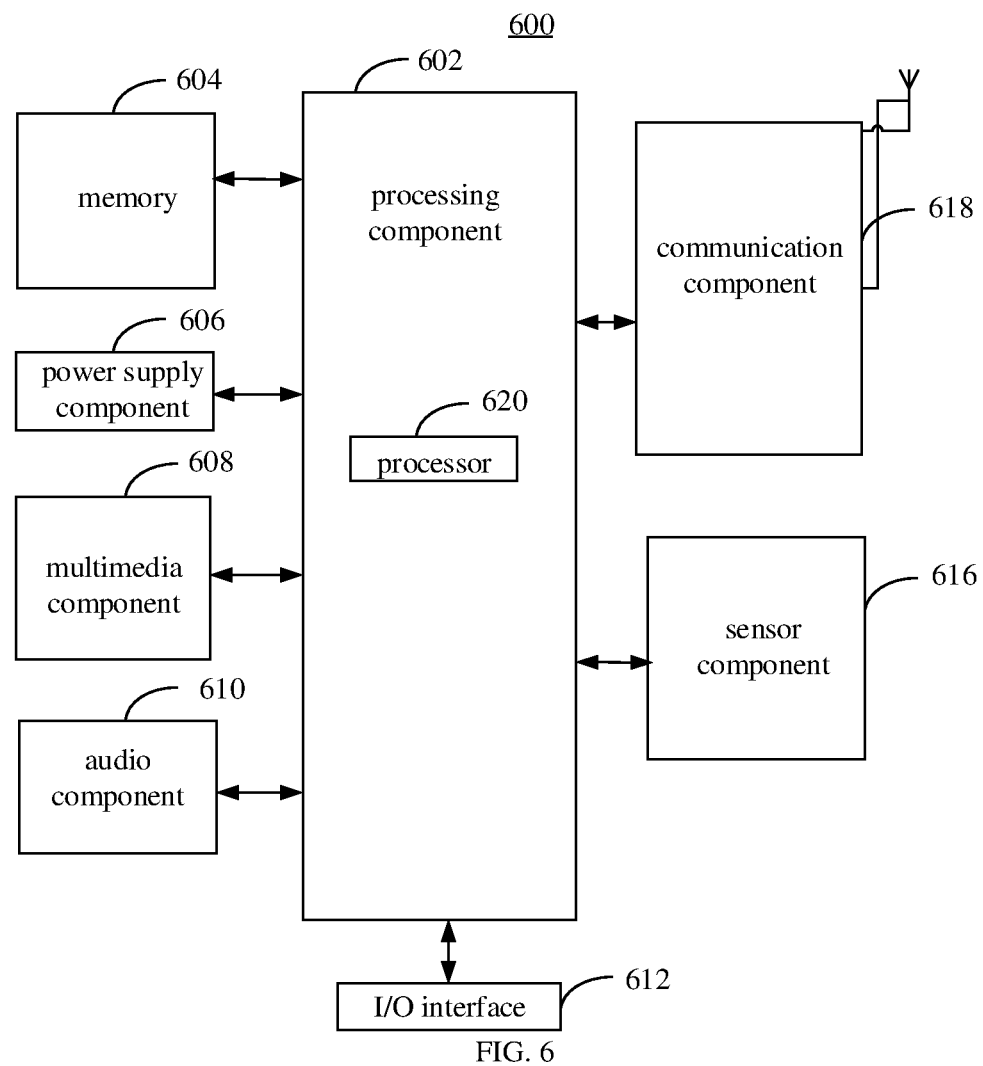
FIG. 6 is a diagram illustrating a structure of a channel transmission apparatus according to an embodiment.

FIG. 6 is a block diagram illustrating an electronic device 100 according to an embodiment. For example, the electronic device 600 may be a terminal such as a smart phone, a tablet, an e-book reader, a multimedia playback device, a wearable device, a vehicle-mounted terminal, an ipad and a smart TV.

As illustrated in FIG. 6, the electronic device 600 may include one or more components: a processing component 602, a memory 604, a power supply component 606, a multimedia component 608, an audio component 610, an input/output (I/O) interface 612, a sensor component 616, and a communication component 618.

The processing component 602 generally controls the whole operation of the electronic device 600, such as the operations related to display, phone call, data communication, camera operation and recording operation. The processing component 602 may include one or more processors 620 to perform instructions, to complete all or part of steps of the above method for channel transmission. In addition, the processing component 602 may include one or more modules for the convenience of interaction between the processing component 602 and other components. For example, the processing component 602 may include a multimedia module for the convenience of interaction between the multimedia component 608 and the processing component 602. For another example, the processing component 602 may read executable instructions from a memory, to implement steps of the method for channel transmission provided in the above each embodiment.

The memory 604 is configured to store all types of data to support the operation of the electronic device 600. Examples of the data include the instructions of any applications or methods operated on the electronic device 600, contact data, phone book data, messages, pictures, videos, etc. The memory 604 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 606 may provide power for all components of the electronic device 600. The power supply component 606 may include power supply management system, one or more power supplies, and other units related to generating, managing and distributing power for the electronic device 600.

The multimedia component 608 includes a display screen of an output interface provided between the electronic device 600 and the user. In some embodiments, the multimedia component 608 includes a front camera and/or a rear camera. When the electronic device 600 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 610 is configured as output and/or input signal. For example, the audio component 610 includes a microphone (MIC). When the electronic device 600 is in operation mode, such as call mode, record mode, and speech recognition mode, the microphone is configured to receive the external audio signals. The audio signals received may be further stored in the memory 604 or sent via the communication component 618. In some embodiments, the audio component 610 further includes a speaker configured to output an audio signal.

The I/O interface 612 provides an interface for the processing component 602 and the peripheral interface module, and the peripheral interface module may be a keyboard, a click wheel, a button, etc. The buttons may include but not limited to a home button, a volume button, a start button and a lock button.

The sensor component 616 includes one or more sensors, configured to provide various aspects of status assessment for the electronic device 600. For example, the sensor component 616 may detect the on/off state of the electronic device 600 and the relative positioning of the component. For example, the component is a display and a keypad of the electronic device 600. The sensor component 616 may further detect the location change of the electronic device 600 or one component of the electronic device 600, the presence or absence of contact between the user and the device 600, the orientation or acceleration/deceleration of the electronic device 600, and the temperature change of the electronic device 600. The sensor component 616 may include a proximity sensor, which is configured to detect the existence of the objects nearby without any physical contact. The sensor component 616 may further include a light sensor such as CMOS or CCD image sensor, which is configured to use in imaging applications. In some embodiments, the sensor component 616 may further include an acceleration transducer, a gyroscope sensor, a magnetic sensor, a pressure sensor or a temperature sensor.

The communication component 618 is configured for the convenience of wire or wireless communication between the electronic device 600 and other devices. The electronic device 600 may access wireless networks based on a communication standard, such as Wi-Fi, 2G, 3G, 4G, 5G or 6G, or their combination. In an exemplary embodiment, the communication component 618 receives broadcast signals or broadcast-related information from an external broadcast management system via a broadcast channel In an exemplary embodiment, the communication component 618 further includes a near field communication (NFC) module to facilitate short-range communication. For example, an NFC module may be implemented based on a radio frequency identification (RFID) technology, an infrared data association (IRDA) technology, an ultra-wideband (UWB) technology, Bluetooth (BT) technology and other technologies.

In an embodiment, the electronic device 600 may be implemented by one or more application specific integrated circuits(ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method for channel transmission.

In an exemplary embodiment, a non-transitory machine-readable storage medium is further provided which includes instructions, such as the memory 604 including instructions, in which the instructions may be executed by the processor 620 of the electronic device 600 to complete the above wireless charging method. For example, the non-transitory computer-readable storage medium may be a ROM, a random access memory (RAM), a CD-ROM, a magnetic tape, a floppy disk, an optical data storage device, etc.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or a conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A channel transmission method performed by a terminal, comprising:
- determining a mapping relationship between at least one basic redundancy version (RV) sequence and a plurality of candidate transmission occasions for sending a physical uplink shared channel (PUSCH);
- determining an actual RV sequence corresponding to each of the plurality of candidate transmission occasions based on the at least one basic RV sequence; and
- repeatedly sending a data block of the PUSCH on a plurality of target transmission occasions respectively based on actual RV sequences corresponding respectively to the plurality of target transmission occasions,
- wherein determining the mapping relationship between the at least one basic RV sequence and the plurality of candidate transmission occasions for sending the PUSCH comprises one of:
- determining the mapping relationship based on a first signaling sent by a base station; or
- determining the mapping relationship based on a predefined configuration.

2. The method according to claim 1, wherein determining the mapping relationship between the at least one basic RV sequence and the plurality of candidate transmission occasions for sending the PUSCH comprises:
- determining a first corresponding relationship between different beam indication information received by different transmission and receiving points (TRPs) corresponding to the base station and the plurality of candidate transmission occasions; wherein the beam indication information is beam related information for sending the PUSCH; and
- determining the mapping relationship based on the basic RV sequences corresponding to the different beam indication information and the first corresponding relationship.

3. The method according to claim 2, wherein determining the actual RV sequence corresponding to the each of the plurality of candidate transmission occasions based on the at least one basic RV sequence comprises:
- dividing the plurality of candidate transmission occasions into a plurality of groups; wherein each group of the candidate transmission occasions corresponds to a same beam indication information;
- determining a basic RV sequence corresponding to each group of the candidate transmission occasions;
- determining at least one of a start value or a sequence offset value of actual RV sequences corresponding to each group of the candidate transmission occasions; wherein the sequence offset value is an RV sequence starting position from which each group of the candidate transmission occasions performs a circular mapping with regard to the basic RV sequence; and
- determining a plurality of actual RV sequences corresponding to each group of the candidate transmission occasions based on the basic RV sequence corresponding to each group of the candidate transmission occasions and the at least one of the start value or the sequence offset value.

4. The method according to claim 3, wherein determining the basic RV sequence corresponding to each group of the candidate transmission occasions comprises one of:
- determining the basic RV sequence corresponding to each group of the candidate transmission occasions based on a second signaling sent by the base station; or
- determining the basic RV sequence corresponding to each group of the candidate transmission occasions based on the predefined configuration.

5. The method according to claim 3, wherein determining the at least one of the start value or the sequence offset value of the actual RV sequences corresponding to each group of the candidate transmission occasions comprises:
- determining the at least one of the start value or the sequence offset value of the actual RV sequences corresponding to each group of the candidate transmission occasions based on a specified information field comprised in downlink control information (DCI) sent by the base station.

6. The method according to claim 5, wherein the specified information field is configured to independently indicate the start value of the actual RV sequences corresponding to each group of the candidate transmission occasions;
- the specified information field is configured to indicate an RV codepoint of association information associated with the at least one of the start value or the sequence offset value of the actual RV sequences corresponding to each group of the candidate transmission occasions; or
- the specified information field is configured to indicate the start value of a first RV sequence relative to first beam indication information in the actual RV sequences corresponding to each group of the candidate transmission occasions; wherein an RV sequence corresponding to the first beam indication information is the first RV sequence.

7. The method according to claim 6, wherein the specified information field is configured to indicate the RV codepoint of the association information associated with the at least one of the start value or the sequence offset value of the plurality of actual RV sequences; and
- determining the at least one of the start value or the sequence offset value of the actual RV sequences corresponding to each group of the candidate transmission occasions comprises at least one of:
- determining the start value of the actual RV sequences corresponding to each group of the candidate transmission occasions that corresponds to the association information indicated by the specified information field based on a predetermined second corresponding relationship between RV codepoints and RV sequence start values; or
- determining the sequence offset value of the actual RV sequences corresponding to each group of the candidate transmission occasions that corresponds to the association information indicated by the specified information field based on a predetermined third corresponding relationship between RV codepoints and sequence offset values.

8. The method according to claim 7, further comprising one of:
- acquiring the second corresponding relationship or the third corresponding relationship configured by the base station via a third signaling; or
- determining the second corresponding relationship or the third corresponding relationship based on the predefined configuration.

9. The method according to claim 5, wherein the specified information field is configured to indicate the start value of the first RV sequence relative to the first beam indication information in the actual RV sequences corresponding to each group of the candidate transmission occasions; and
  determining the start value of the actual RV sequences corresponding to each group of the candidate transmission occasions comprises:
  determining an offset value of start values of other RV sequences in the actual RV sequences corresponding to each group of the candidate transmission occasions relative to the start value of the first RV sequence; and
  determining the start values of the other RV sequences respectively based on the start value of the first RV sequence and the offset value.

10. The method according to claim 9, further comprising one of:
  acquiring the offset value configured by the base station via a fourth signaling; or
  determining the offset value based on the predefined configuration.

11. The method according to claim 1, wherein the plurality of candidate transmission occasions comprise K1 nominal transmission occasions; wherein the K1 nominal transmission occasions are located within different slots respectively, start symbol positions of the K1 nominal transmission occasions within respective slots are same, and each slot contains a same number of continuous symbols; and
  the plurality of target transmission occasions comprise a plurality of second transmission occasions, in response to a first transmission occasion existing in the K1 nominal transmission occasions; wherein the first transmission occasion is a transmission occasion at which uplink PUSCH transmission is unable to be performed, and the plurality of second transmission occasions are transmission occasions at which uplink PUSCH transmission is able to be performed in the K1 nominal transmission occasions.

12. The method according to claim 1, wherein the plurality of candidate transmission occasions comprise K1' actual transmission occasions; wherein the K1' actual transmission occasions are transmission occasions at which uplink PUSCH transmission is able to be performed in K1 nominal transmission occasions, and the K1 nominal transmission occasions are located within different slots respectively, start symbol positions of the K1 nominal transmission occasions within respective slots are same, and each slot contains a same number of continuous symbols; and
  the plurality of target transmission occasions comprise the K1' actual transmission occasions.

13. The method according to claim 1, wherein the plurality of candidate transmission occasions comprise K2' actual transmission occasions; wherein the K2' actual transmission occasions are actual transmission occasions obtained by dividing K2 nominal transmission occasions, and the K2 nominal transmission occasions are back-to-back continuously allocated transmission occasions; and
  the plurality of target transmission occasions comprise a plurality of second actual transmission occasions; wherein the plurality of second actual transmission occasions are transmission occasions at which uplink PUSCH transmission is able to be performed in the K2' actual transmission occasions.

14. The method according to claim 1, wherein the plurality of candidate transmission occasions comprise K2" actual transmission occasions; wherein the K2" actual transmission occasions are transmission occasions at which uplink PUSCH transmission is able to be performed in K2' actual nominal transmission occasions; the K2' actual transmission occasions are actual transmission occasions obtained by dividing K2 nominal transmission occasions; and the K2 nominal transmission occasions are back-to-back allocated continuous transmission occasions; and
  the plurality of target transmission occasions comprise the K2" actual transmission occasions.

15. The method according to claim 1, wherein determining the mapping relationship between the at least one basic RV sequence and the plurality of candidate transmission occasions for sending the PUSCH comprises:
  determining the mapping relationship between the at the least one basic RV sequence and all candidate transmission occasions for sending the PUSCH.

16. The method according to claim 15, wherein the all candidate transmission occasions comprise all nominal transmission occasions; wherein the plurality of target transmission occasions comprise all actual transmission occasions at which uplink PUSCH transmission is able to be performed in the all nominal transmission occasions.

17. The method according to claim 15, wherein the all candidate transmission occasions comprise all actual transmission occasions at which PUSCH transmission is able to be performed; and
  the plurality of target transmission occasions comprise the all actual transmission occasions.

18. A non-transitory computer-readable storage medium having a computer program stored thereon, wherein the computer program is configured to perform a channel transmission method, the method comprising:
  determining a mapping relationship between at least one basic redundancy version (RV) sequence and a plurality of candidate transmission occasions for sending a physical uplink shared channel (PUSCH);
  determining an actual RV sequence corresponding to each of the plurality of candidate transmission occasions based on the at least one basic RV sequence; and
  repeatedly sending a data block of the PUSCH on a plurality of target transmission occasions respectively based on actual RV sequences corresponding respectively to the plurality of target transmission occasions,
  wherein determining the mapping relationship between the at least one basic RV sequence and the plurality of candidate transmission occasions for sending the PUSCH comprises one of:
  determining the mapping relationship based on a first signaling sent by a base station; or
  determining the mapping relationship based on a predefined configuration.

19. A channel transmission apparatus, comprising:
  a processor; and
  a memory configured to store instructions executable by the processor;
  wherein the processor is configured to perform:
  determining a mapping relationship between at least one basic redundancy version (RV) sequence and a plurality of candidate transmission occasions for sending a physical uplink shared channel (PUSCH);
  determining an actual RV sequence corresponding to each of the plurality of candidate transmission occasions based on the at least one basic RV sequence; and
  repeatedly sending a data block of the PUSCH on a plurality of target transmission occasions respectively based on actual RV sequences corresponding respectively to the plurality of target transmission occasions, wherein determining the mapping relationship between the at least one basic RV sequence and the plurality of candidate transmission occasions for sending the PUSCH comprises one of:

determining the mapping relationship based on a first signaling sent by a base station; or determining the mapping relationship based on a pre-defined configuration.

* * * * *